(12) United States Patent
Greb et al.

(10) Patent No.: US 11,953,094 B2
(45) Date of Patent: Apr. 9, 2024

(54) METHOD FOR RESETTING A PARKING LOCK OPERATING SYSTEM AND PARKING LOCK OPERATING SYSTEM

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/018,307

(22) PCT Filed: Jul. 5, 2021

(86) PCT No.: PCT/DE2021/100572
§ 371 (c)(1),
(2) Date: Jan. 27, 2023

(87) PCT Pub. No.: WO2022/028641
PCT Pub. Date: Feb. 10, 2022

(65) Prior Publication Data
US 2023/0296172 A1   Sep. 21, 2023

(30) Foreign Application Priority Data
Aug. 5, 2020   (DE) .................... 10 2020 120 622.4

(51) Int. Cl.
*F16H 63/34*   (2006.01)
(52) U.S. Cl.
CPC ..... *F16H 63/3433* (2013.01); *F16H 63/3483* (2013.01)

(58) Field of Classification Search
CPC .. F16H 63/3433; F16H 63/3483; F16H 63/36; F16H 63/3416–3491; F16H 63/48–483
See application file for complete search history.

(56) References Cited

U.S. PATENT DOCUMENTS

| | | | |
|---|---|---|---|
| 3,205,863 A | 9/1965 | Rhoades | |
| 2014/0110216 A1* | 4/2014 | Pollack | F16H 63/3483 192/219.4 |

(Continued)

FOREIGN PATENT DOCUMENTS

| | | |
|---|---|---|
| CN | 110425278 A | 11/2019 |
| DE | 4127991 A1 | 2/1993 |

(Continued)

*Primary Examiner* — Jacob S. Scott
*Assistant Examiner* — Farhana Pervin

(57) ABSTRACT

A method for resetting a parking lock operating system for a motor vehicle includes providing the parking lock operating system and switching the parking lock operating system. The parking lock operating system includes a hydraulic fluid supply line with a hydraulic fluid, a base position in which a parking lock is active, and a transport position in which the parking lock is active. The parking lock operating system is switched from the base position to the base position or from the transport position to the base position by, in the following order: increasing a pressure of the hydraulic fluid above a second pressure threshold, lowering the pressure below a first pressure threshold, less than the second pressure threshold, increasing the pressure above the second pressure threshold, and lowering the pressure of the hydraulic fluid below the first pressure threshold.

18 Claims, 5 Drawing Sheets

(56) References Cited

U.S. PATENT DOCUMENTS

| | | | | |
|---|---|---|---|---|
| 2018/0119816 A1* | 5/2018 | Gollmer | .............. | F16H 63/3483 |
| 2019/0085974 A1* | 3/2019 | Kidachi | ................ | B60W 30/18 |
| 2019/0271395 A1* | 9/2019 | Schwegler | .......... | F16H 63/3433 |
| 2020/0096102 A1* | 3/2020 | Kasami | ............... | F16H 63/3475 |

FOREIGN PATENT DOCUMENTS

| | | | |
|---|---|---|---|
| DE | 102011105068 | A1 | 7/2012 |
| DE | 102015214037 | A1 | 1/2017 |
| DE | 102016101486 | A1 | 8/2017 |
| IN | 110588610 | A | 12/2019 |
| WO | 2009047520 | A2 | 4/2009 |
| WO | 2022028645 | A1 | 2/2022 |

* cited by examiner

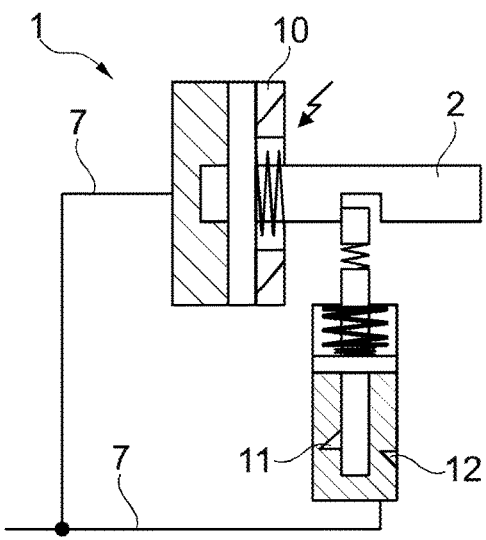
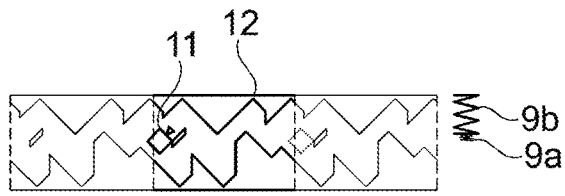
Fig. 5a　　Fig. 5b
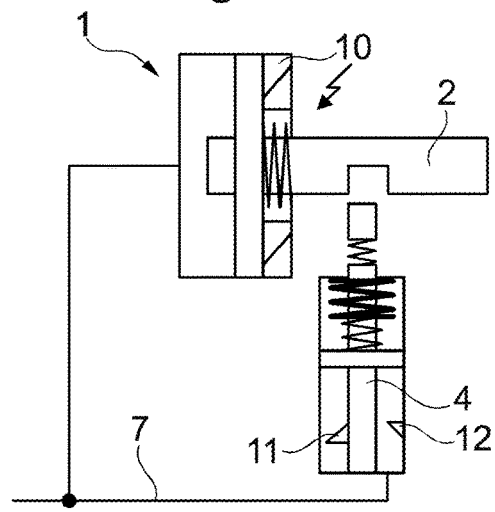
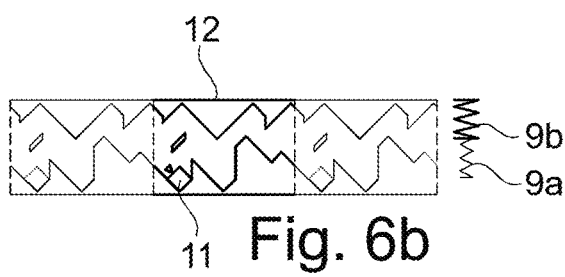
Fig. 6a　　Fig. 6b
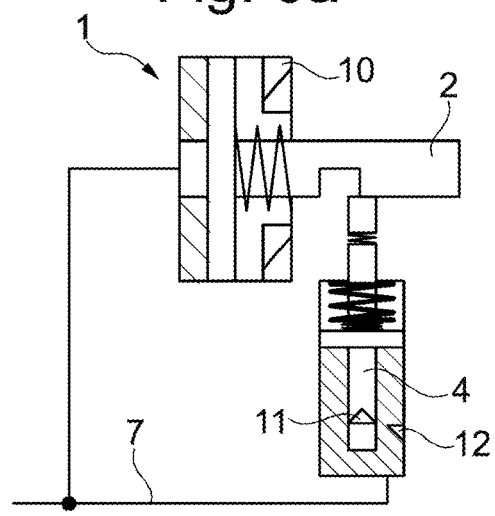
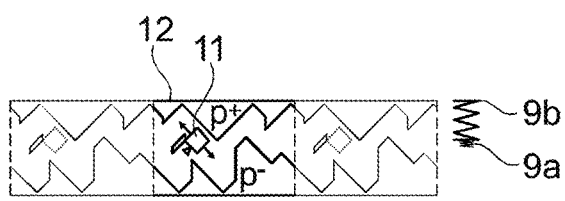
Fig. 7a　　Fig. 7b

METHOD FOR RESETTING A PARKING LOCK OPERATING SYSTEM AND PARKING LOCK OPERATING SYSTEM

CROSS-REFERENCE TO RELATED APPLICATIONS

This application is the United States National Phase of PCT Appln. No. PCT/DE2021/100572 filed Jul. 5, 2021, which claims priority to German Application No. DE102020120622.4 filed Aug. 5, 2020, the entire disclosures of which are incorporated by reference herein.

TECHNICAL FIELD

The present disclosure relates to a method for resetting a parking lock operating system for a motor vehicle, wherein the parking lock operating system has a base position in which a parking lock of the parking lock operating system is active, and a transport position in which the parking lock is active. The present disclosure further relates to a parking lock operating system.

BACKGROUND

In the prior art, when what is termed a transport mode is provided, in addition to a normal mode/driving mode after a power failure, it is necessary to check the state/position of the parking lock operating system. Depending on when the power failed, the parking lock operating system is in the base position or in a transport position, in each of which (to ensure a Normally-P function) the parking lock is active. However, the current position of the parking lock operating system is decisive in determining the position to which the parking lock operating system switches by applying pressure. It is known to provide a sensor that detects a position of the parking lock operating system, but this is expensive and entails an increased control effort.

SUMMARY

The present disclosure provides a parking lock operating system that is switched both from the base position and from the transport position to the base position if a pressure present in a hydraulic fluid supply line of the parking lock operating system is increased twice in succession above a second pressure threshold and is decreased after each pressure increase above the second pressure threshold below a first pressure threshold, which is at a lower pressure value than the second pressure threshold. This means that the parking lock operating system is increased above a second pressure threshold for resetting, then lowered below a first pressure threshold, then increased above the second pressure threshold and then lowered again below the first pressure threshold. In other words, by applying pressure twice above a second pressure threshold, a wake-up procedure is provided which. after an error such as a power failure, allows the parking lock operating system to be switched to its base position in an operable manner, regardless of the initial position, namely the base position or the transport position.

According to one embodiment, the parking lock operating system that is in the base position can be switched to a driving position in which the parking lock is inactive and activation of the parking lock is blocked when a holding magnet of the parking lock operating system is energized when the pressure present in a hydraulic fluid supply line is increased above the second pressure threshold. According to one embodiment, the parking lock operating system that is in the driving position can be switched to the base position when the pressure present in a hydraulic fluid supply line is lowered below the first pressure threshold. This means that if the parking lock operating system was in its base position as a starting position, the parking lock opens/switches inactive and closes/switches active again twice, so that it is in its base position after the wake-up procedure implemented by the application of pressure.

According to one embodiment, the parking lock operating system that is in the transport position can be switched to a latching position, in which the parking lock is inactive and activation of the parking lock is blocked by a latching mechanism of the parking lock operating system, when the pressure present in a hydraulic fluid supply line is increased above the second pressure threshold and is then lowered below the first pressure threshold.

According to one embodiment, the parking lock operating system located in the latching position can be switched to the base position when the pressure present in a hydraulic fluid supply line is increased above the second pressure threshold and is then lowered below the first pressure threshold. This means that the parking lock operating system, if it was in its transport position as the starting position, first activates the latching in the latching position, in which a limp-home is guaranteed, for example, and then immediately deactivates it again, so that is in its base position following the wake-up procedure which is implemented when pressure is applied.

More precisely, the present disclosure also provides a parking lock operating system for a motor vehicle, having a guide link and a latching element that can be twisted and axially displaced relative to the guide link A location of the latching element relative to the guide link defines different positions of the parking lock operating system. The latching element and the guide link have corresponding sloping surfaces, which are matched to one another and interact with one another in such a way that the latching element is twisted relative to the guide link when the latching element is axially displaced along the sloping surfaces by a pressure present in a hydraulic fluid supply line of the parking lock operating system. The sloping surfaces are arranged in such a way that the parking lock operating system is switched to the base position both from a base position, in which a parking lock of the parking lock operating system is active, and from the transport position, in which the parking lock is active, if a pressure present in the hydraulic fluid supply line is successively increased twice above a second pressure threshold and is lowered after each pressure increase above the second pressure threshold below a first pressure threshold, which is at a lower pressure value than the second pressure threshold. Thus, through the interaction of the sloping surfaces matched to the pressure thresholds and the control of the pressure application, the parking lock operating system is switched to the base location/base position by the predetermined wake-up procedure, regardless of the location of the latching element/the position of the parking lock operating system.

According to one embodiment, a first sloping surface of the guide link can be arranged such that the latching element is twisted from a base location, which defines a base position of the parking lock operating system, in a first direction of rotation into a first intermediate location when the pressure is increased above the first pressure threshold.

According to the embodiment, a second sloping surface of the guide link can be arranged in such a way that the latching element is twisted from the intermediate location into a second direction of rotation, opposite the first direction of rotation, into a driving location that defines a driving position of the parking lock operating system, when the pressure is increased above the second pressure threshold.

According to the embodiment, a third sloping surface of the guide link can be arranged such that the latching element is twisted from the intermediate location in the first direction of rotation into a transport position that defines a transport location of the parking lock operating system when the pressure is lowered below the first pressure threshold.

According to the embodiment, a fourth sloping surface of the guide link can be arranged such that the latching element is twisted from the transport location in the first direction of rotation into a second intermediate location when the pressure is increased above the second pressure threshold.

According to the embodiment, a fifth sloping surface of the guide link can be arranged such that the latching element is twisted from the second intermediate location in the first direction of rotation into a latching location that defines a latching position of the parking lock operating system when the pressure is lowered below the first pressure threshold.

According to the embodiment, a sixth sloping surface of the guide link can be arranged such that the latching element is twisted from the latching location in the first direction of rotation into a third intermediate location when the pressure is increased above the second pressure threshold.

According to the embodiment, a seventh sloping surface of the guide link can be arranged such that the latching element is twisted from the third intermediate location in the first direction of rotation into the base location when the pressure is lowered below the first pressure threshold.

The latching element is thus twisted in the first direction of rotation or in the second direction of rotation by the interaction of the sloping surfaces matched to the pressure thresholds and the control of the pressure application in order to switch between the different positions/locations.

According to a further aspect, which can be present independently of or in combination with the aspects described above, the present disclosure also relates to a parking lock operating system for a motor vehicle, e.g., a hybrid or purely electric motor vehicle. The parking lock operating system has an operating element that can be coupled or is coupled to a parking lock. The operating element can be displaced between a blocked position in which the parking lock is active, i.e., an output component of the motor vehicle is blocked against rotation, and an unblocked position in which the parking lock is inactive, i.e., the output component of the motor vehicle is released for rotation. For example, the operating element can be displaced along its longitudinal axis. For example, the operating element can be displaced into its unblocked position against the restoring force of a (first) spring element. The parking lock operating system has a locking element that can be coupled or is coupled to the operating element. The locking element can be displaced between a locking position, in which the locking element positively fixes the operating element in its unblocked position, i.e., the locking of the operating element is active, and an unlocked position, in which the operating element can be moved between its blocked position and its unblocked position, i.e., the locking of the operating element is inactive. For example, the locking element can be displaced along its longitudinal axis. For example, the locking element can be displaced into its locking position against the restoring force of a (second) spring element. In other words, the locking element is designed to positively fix/hold the operating element in its unblocked position.

The operating element and the locking element are each operatively connected to a hydraulic operating cylinder. The pressure chambers of the two hydraulic operating cylinders are also connected to a common hydraulic fluid supply line and are matched to one another in such a way that the locking element is displaced from a lower pressure value present in the hydraulic fluid supply line and the operating element is displaced from a higher pressure value present in the hydraulic fluid supply line, which is higher than the lower pressure value. In other words, the locking element is already displaced from a lower pressure value present in the hydraulic medium supply line than the operating element. Such a coupling of the two operating cylinders that control the operating element and the locking element enables hydraulic control of the parking lock that is as simply structured as possible and is also direct. In addition, a transport state of the motor vehicle can be reliably switched using simple means, so that the parking lock is unblocked/kept inactive when the hydraulic supply is depressurized. As a result, all other operating states of the parking lock operating system can also be controlled easily.

Furthermore, the locking element is between a latching location/latching preparation location, in which a release of the locking element from its locking position is positively blocked, i.e., the locking element is positively fixed/locked/latched in its locking position, e.g., against the disengaging force/restoring force of a spring element, and a release location, in which the locking element can be (freely) moved/displaced, repositioned, e.g., twisted, between its locking position and its unlocking position. In other words, the locking element can also be brought into a latching location/latching preparation location, i.e., a stable location in which the locking element is positively fixed or can be fixed, by repositioning, e.g., twisting it, and can be released from it. This means that the locking element can be repositioned, e.g., twisted, between the latching location and the location released from the latching location/release location. In other words, the latching mechanism can be activated and deactivated by twisting the locking element. The locking element can be held in its locking position against the spring force of the locking spring by the mechanical latching mechanism.

The parking lock operating system has a latching mechanism for positively holding the locking element in its locking position, which is designed in such a way that the locking element is in the latching preparation location when the pressure present in the hydraulic medium supply line is decreased from a pressure value between a first pressure threshold and a second pressure threshold to a pressure value below the first pressure threshold.

In other words, the locking element has a first degree of freedom in order to be repositioned between its locking position and its unlocking position (for example by applying pressure), the first degree of freedom being formed, for example, by an axial displaceability of the locking element. In addition, the locking element has a second degree of freedom in order to be repositioned between its latching preparation location and its release location, the second degree of freedom being formed, for example, by a twisting about a longitudinal axis of the locking element. This means that the parking lock operating system/parking lock operating mechanism is designed in such a way that the locking element can be twisted between its latching preparation location and its release location by controlling the pressure present in the hydraulic fluid supply line, and the locking element can be locked without pressure, i.e., it can be mechanically/positively fixed when it is in the latching preparation location.

With known parking lock operating systems, automatic closing of the parking lock is in principle ensured, but a transport state of the motor vehicle in which an on-board network is switched off or is not sufficiently charged, or an internal combustion engine is switched off, is not possible and the parking lock remains closed. Here, the parking lock operating system described is less complex, i.e., it is constructed with a small number of individual parts. Furthermore, it can thus be ensured that a safe state is always guaranteed in all situations, i.e., that the parking lock always closes in the event of a power failure, even in intermediate states that occur briefly during operation.

According to an example embodiment, the first pressure threshold could/can correspond to the lower pressure value from which the locking element is displaced and/or the second pressure threshold can correspond to the higher pressure value from which the operating element is displaced. As a result, the repositioning of the locking element and/or the operating element for locking/unblocking or unlocking/blocking is coupled with the repositioning between the latching preparation location and the release location.

Accordingly, the two hydraulic operating cylinders may be matched to one another in such a way that the operating element is displaced when an upper/higher pressure value in the hydraulic medium supply line is exceeded, at which point the locking element is pressed against the operating element. As a result, the operation of the locking element is reliably implemented.

According to an example embodiment, the latching mechanism can have a guide link and a latching element that can be twisted and axially displaced relative to the guide link. The latching element is, for example, firmly connected to the locking element. The guide link can be firmly coupled to the locking cylinder. Here, the locking spring acting on the locking element also acts on the latching mechanism.

The latching element and the guide link may have corresponding sloping surfaces which interact with one another in such a way that the latching element is twisted relative to the guide link (about its longitudinal axis) when the latching element is displaced axially. In other words, an axial displacement of the locking element is coupled with the twisting of the locking element. As a result, the twisting of the locking element can also be controlled via the hydraulic medium supply line. Thus, there is no need for a separate actuation mechanism for the second degree of freedom of the locking element. An increase in the pressure value corresponds to an axial displacement of the locking element (and thus of the latching element), so that the twisting of the locking element is coupled with a repositioning of the locking element, e.g., into its unlocked position.

According to an example embodiment, the latching element and the guide link can be arranged and matched to the operating cylinder and/or the locking cylinder, e.g., by forming a first sloping surface on the guide link, so that the latching element is twisted in a first direction of rotation when the pressure value present in the hydraulic fluid supply line is increased from a pressure value below the first pressure threshold to a pressure value above the first pressure threshold. Alternatively or additionally, the latching element and the guide link can be arranged and matched to the operating cylinder and/or the locking cylinder, e.g., by forming a second sloping surface (e.g., perpendicular to the first sloping surface) on the guide link, so that the latching element is twisted into a second direction of rotation (opposite the first direction of rotation) when the pressure value present in the hydraulic fluid supply line is increased from a pressure value below the second pressure threshold to a pressure value above the second pressure threshold. Here, the twisting of the latching element can be controlled in a targeted manner, e.g., in both directions of rotation, by controlling the pressure in the hydraulic medium supply line. The parking lock operating system can thus be functionally operated in normal operation without the latching element being twisted (further in the first direction of rotation) into the latching preparation location.

According to an example embodiment, the latching mechanism can be designed in the manner of an adjustment mechanism of a ballpoint pen refill. Such an adjustment mechanism is known, for example, from U.S. Pat. No. 3,205,863 A, so that a detailed explanation is omitted.

According to an example embodiment, the locking element can be displaced into its locking position against the restoring force of a spring element, and a spring characteristic of the spring element is matched to the operating cylinder and/or the locking cylinder in such a way that the spring force acting on the locking element is greater above the lower pressure value than below the lower pressure value. Thus, a force provided by the spring element and counteracting the hydraulic pressure increases with increasing axial displacement of the locking element.

According to the embodiment, the spring element can have a first single spring arranged to resist displacement of the locking element below the lower pressure value and a second single spring arranged to resist displacement of the locking element above the lower pressure value, and the first individual spring has a lower spring constant than the second individual spring. This means that the locking element is first moved against the spring force of a weak spring and then (when pressure is applied with a pressure above the first pressure threshold) against the spring force of a strong spring.

For easy controllability of the operating element, an electrically operated holding magnet holding the operating element in its unblocked position may be present.

In addition, the operating cylinder and the locking cylinder may be matched to one another in such a way that when the pressure is reduced, starting from a pressure above the higher pressure value, the hydraulic pressure within the operating cylinder assigned to the operating element first falls below the upper pressure value (and consequently the operating element experiences a tensile force towards its blocked position) and subsequently the hydraulic pressure within the locking cylinder associated with the locking element drops below the lower pressure value (and consequently the locking element experiences a tensile force towards its unlocked position). This ensures reliable functioning of the parking lock operating system.

In other words, the present disclosure relates to a hydraulic parking lock operating system in which a Normally-P functionality is fulfilled, i.e., the parking lock is automatically activated in the event of a power failure, in which a transport mode is realized in which the parking lock/parking lock mechanism can be kept deactivated independently of the power supply and the hydraulic supply i.e., for example, it can be de-energized and depressurized, and which can be adjusted via a simple control valve. In other words, the present disclosure relates to a parking lock operating system with a blocking element/locking element that has a first degree of freedom for a Normally-P function in order to automatically engage a parking lock in the event of a power failure, and has a second degree of freedom for a transport mode or a limp-home function in order to be able to keep the parking lock open without current and without pressure. Here, the blocking element is latched by a ballpoint pen refill mechanism so that it remains in a stable location against the disengaging force of a spring member.

According to a further aspect, which can be present independently of or in combination with the aspects described above, the present disclosure also relates to a method for operating a parking lock operating system for a motor vehicle. The parking lock operating system has an unpressurized base position ("unpressurized I"), in which the parking lock is active, the parking lock operating system is switched from the base position to a first intermediate position ("between normal and transport lanes", low pressure) when the pressure is increased above a first pressure threshold, and the parking lock operating system is switched from the first intermediate position to a driving position ("open parking position I", full pressure), in which the parking lock is inactive, when the pressure exceeds a second pressure threshold which is at a higher pressure value than the first pressure threshold. The parking lock operating system is switched from the first intermediate position into a transport position ("unpressurized II") When the pressure is decreased below the first pressure threshold, the parking lock operating system is switched from the transport position to a second intermediate position ("open parking position II", full pressure), in which the parking lock is inactive, when the pressure is increased above the second pressure threshold, and the parking lock operating system is switched from the second intermediate position to a latching position ("unpressurized III"), in which the parking lock is inactive, when the pressure is lowered below the first pressure threshold. The parking lock operating system can thus be operated in a normal mode (base position—first intermediate position—driving position) or switched over to a transport mode (base position—first intermediate position—transport position—second intermediate position—latching position). In the transport mode, it is possible to keep the parking lock operating system locked in the latching position without pressure and current.

According to an example embodiment, the parking lock operating system can be switched from the latching position to a third intermediate location ("between transport and normal lane", full pressure) when the pressure is increased above the second pressure threshold, and switched from the third intermediate location to the base position when the pressure is decreased below the first pressure threshold. The arrested position can thus be released and the parking lock operating system can be reset from its transport mode to its normal mode.

According to an example embodiment, the parking lock operating system can be switched from the driving position to the base position when the pressure is lowered below the first pressure threshold. A Normally-P mode is thus implemented without having to go through the transport mode.

BRIEF DESCRIPTION OF THE DRAWINGS

The present disclosure is explained below with the aid of drawings. In the figures:

FIGS. 2a to 13b show schematic representations of different positions of the parking lock operating system and associated locations of a latching mechanism.

DETAILED DESCRIPTION

The figures are only schematic in nature and serve only for understanding the disclosure. The same elements are provided with the same reference symbols. The features of the individual embodiments can be interchanged.

Figure 1:
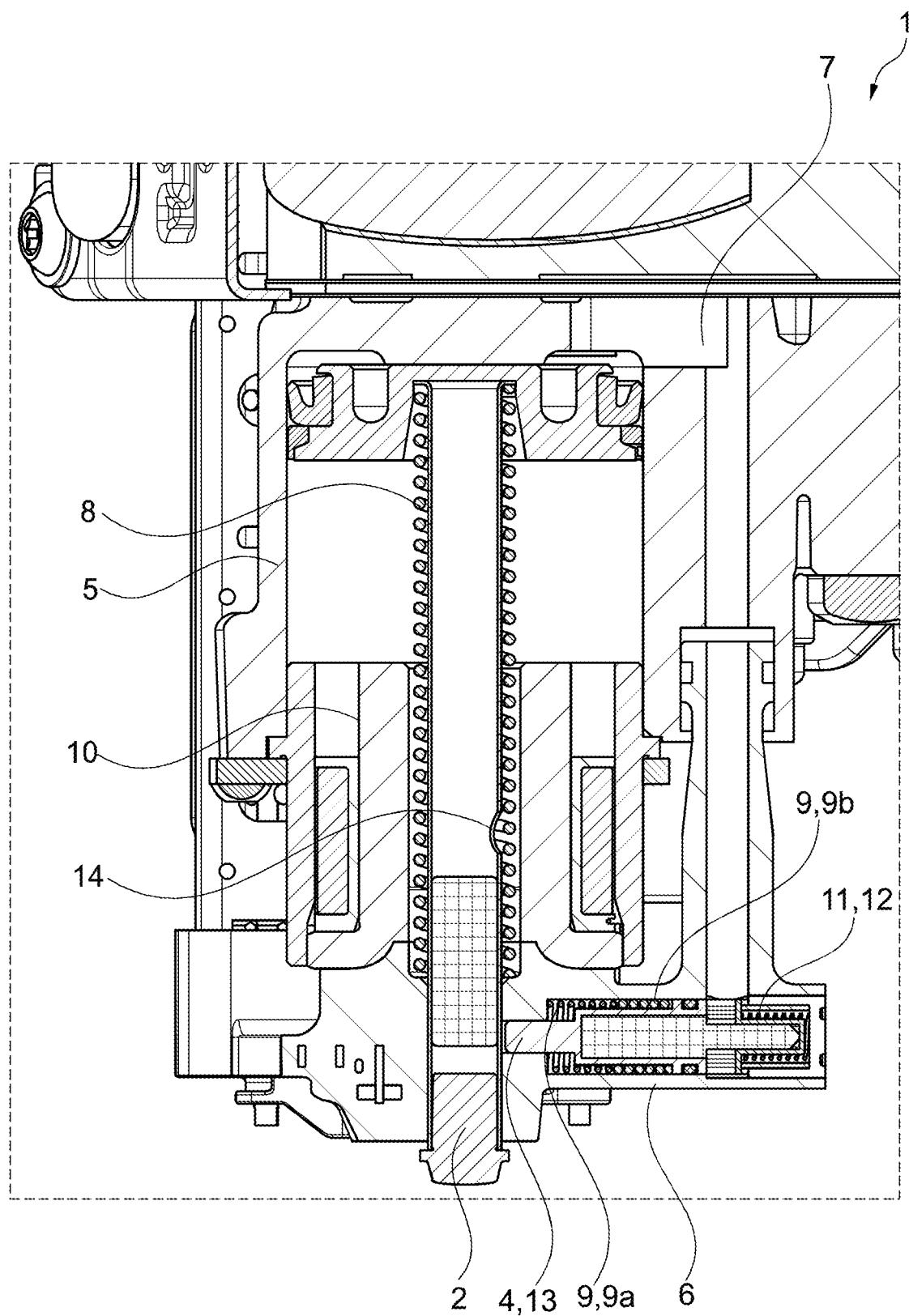
FIG. 1 shows longitudinal cross-section of a parking lock operating system.

FIG. 1 shows a longitudinal cross-section of a parking lock operating system 1 for a motor vehicle. The functioning of the parking lock operating system 1 is explained in more detail based on the schematic representations of FIGS. 2a to 13b.

The parking lock operating system 1 has an operating element 2. The operating element 2 of the parking lock operating system 1 is used directly for the (mechanical) adjustment of a parking lock (not shown). The operating element 2 can be coupled or is coupled to the parking lock. The operating element 2 can be displaced between a blocked position and an unblocked position. In the blocked position, the parking lock is active. In the unblocked position, the parking lock is inactive.

The parking lock operating system 1 has a locking element 4. The locking element 4 can be coupled or is coupled to the operating element 2. The locking element 4 can be displaced between a locking position and an unlocking position. In the locking position, the locking element 4 fixes the operating element 2 in a positive manner in its unblocked position. In other words, the blocking of the operating element 2 is active, so that the operating element 2 cannot be moved (back) into its unblocked position. In the unlocked position, the blocking of the operating element 2 is inactive/not active, so that the operating element 2 can be moved between its blocked position and its unblocked position.

The operating element 2 is operatively connected/coupled to a hydraulic operating cylinder 5 and can be displaced thereby. The locking element 4 is operatively connected/coupled to a hydraulic locking cylinder 6 and can be displaced thereby. The operating cylinder 5 and the locking cylinder 6 are each connected to a common hydraulic medium supply line 7 on the side of their pressure chamber. This means that the operating cylinder 5 is coupled to a hydraulic unit via the same hydraulic medium supply line 7 as the locking cylinder 6, so that a pressure chamber of the operating cylinder 5 always has the same hydraulic pressure as a pressure chamber of the locking cylinder 6.

The operating element 2 can be longitudinally displaceable along its axial direction. The operating element 2 can be displaceable against the restoring force/disengaging force/spring force of a first spring element/an operating spring 8. The operating element 2 can be biased into its blocked position by the operating spring 8. When the operating cylinder 5 is subjected to a hydraulic pressure above an upper pressure value, the operating element 2 is pressed/repositioned from its blocked position against the spring force of the operating spring 8 into its unblocked position. The locking element 4 can be longitudinally displaceable (for adjustment between its unlocked position and its locked position) along its axial direction.

The locking element 4 can be displaceable against the restoring force/disengaging force/spring force of a second spring element/a locking spring 9. The locking element 4 can be biased into its unlocked position by the locking spring 9. When the locking cylinder 6 is subjected to hydraulic pressure above a lower pressure value, the locking element 4 is pressed/repositioned from its unlocking position against the spring force of the locking spring 9 into its locking position. In other words, the locking element 4 is designed for positively fixing/holding the operating element 2 in its unblocked position, e.g., for implementing a transport state of the motor vehicle. The locking spring 9 has a first individual spring 9a and a second individual spring 9b. The first individual spring 9a is arranged in such a way that it counteracts a displacement of the locking element 4 below the lower pressure value. The second individual spring 9b is arranged in such a way that it counteracts a displacement of the locking element 4 above the lower pressure value. The first individual spring 9a has a lower spring constant than the second individual spring 9b.

The operating cylinder 5 and the locking cylinder 6 are each matched to one another in such a way (e.g., by dimensioning the pressure chambers and/or by dimensioning the operating spring 8 and the locking spring 9) that starting from a lesser/lower pressure value present in the hydraulic fluid supply line 7, the locking element 4 is displaced from a first pressure threshold and the operating element 2 is displaced from a higher/upper pressure value present in the hydraulic medium supply line 7, which is higher than the lower pressure value from a second pressure threshold. The operating cylinder 5 and the locking cylinder 6 are thus matched to one another in such a way that the operating element 2 is only displaced when the second pressure threshold in the hydraulic fluid supply line 7 is exceeded, at which point the locking element 4 may be already pressed against the operating element 2. At the same time, the operating cylinder 5 and the locking cylinder 6 are matched to one another in such a way that when the pressure within the hydraulic fluid supply line 7 is reduced, starting from a pressure above the second pressure threshold, the hydraulic pressure within the operating cylinder 5 first falls below the second pressure threshold and then immediately afterwards, the hydraulic pressure within the locking cylinder 6 falls below the first pressure threshold.

The locking element 4 can be repositioned, e.g., twisted, between a latching location/latching preparation location and a release location. In the latching location, a release of the locking element 4 from its locking position is positively blocked, i.e., the locking element 4 is positively fixed/locked/latched in its locking position. The locking element 4 remains in a stable location, e.g., against the disengaging force/restoring force of the locking spring 9. In the release location, the locking element 4 can be moved/displaced (freely) between its locking position and its unlocking position. The locking element 4 can be twisted about its longitudinal axis (for adjustment between the latching location and the release location). In other words, the locking element has a first degree of freedom for adjustment between its unlocked position and its locking position and a second degree of freedom for adjustment between its latching location and its release location.

During normal driving operation of the motor vehicle, the operating element 2 is held in its unblocked position by a holding magnet 10, which also serves as a stop. When the operating element 2 is held in the unblocked position by the energized holding magnet 10, the hydraulic pressure at the operating cylinder 5 can be reduced below the upper pressure value or the operating cylinder 5 can be depressurized.

The parking lock operating system 1 has a latching mechanism for positively holding the locking element 4 in its locking position. The latching mechanism can be designed in the manner of an adjustment mechanism of a ballpoint pen refill. The latching mechanism has a latching element 11 and a guide link 12. The latching element 11 is firmly coupled to the locking element 4. The guide link 12 is firmly coupled to the locking cylinder 6. The latching element 11 and the guide link 12 have corresponding sloping surfaces which interact with one another in such a way that the latching element 11 is twisted relative to the guide link 12 when the latching element 11 is axially displaced along the sloping surfaces. A force in the axial direction thus creates a torque, i.e., a rotation around the longitudinal axis of the locking element 4.

The locking element 4 is implemented as a pin and can be displaced transversely to the operating element 2. At its end 13 facing the operating element 2, the locking element 4 can be brought into positive engagement with the operating element 2, e.g., with a recess serving as a positive-locking element 14.

The functioning of the parking lock operating system 1 is explained below with reference to different positions of the parking lock operating system 1.

Figure 2A:
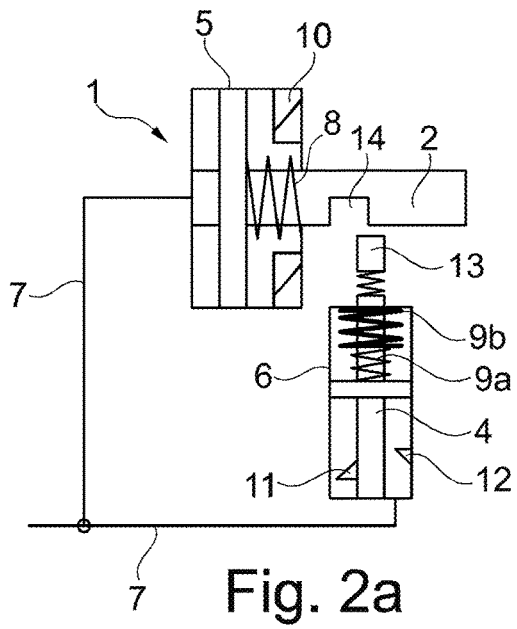
Figure 2B:
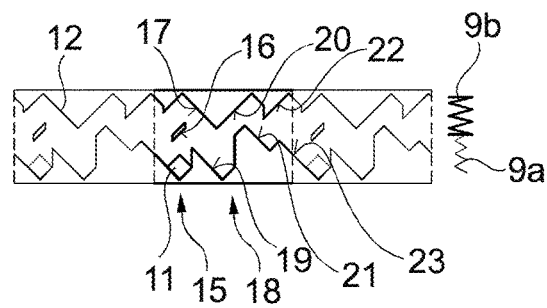

In FIG. 2a, a base position of the de-energized and depressurized parking lock operating system 1 is shown. The hydraulic pressure is below the first pressure threshold, so that the spring force of the operating spring 8 holds the operating element 2 in its blocked position/the operating element 2 is retracted and the spring force of the locking spring 9 holds the locking element 4 in its unlocked position/the locking element 4 is retracted. The parking lock is active. In FIG. 2b a corresponding base location of the latching mechanism is shown. The latching element 11 is located in a normal lane 15 of the guide link 12.

Figure 3A:
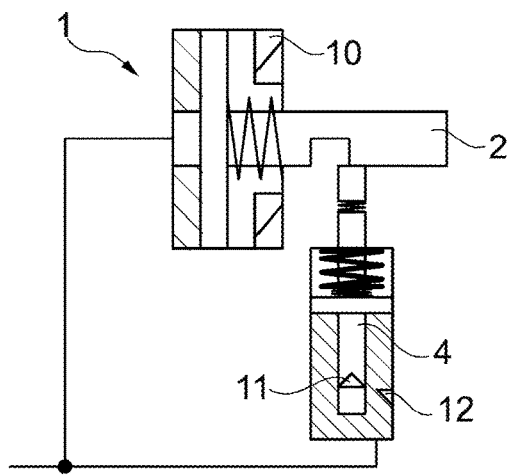
Figure 3B:
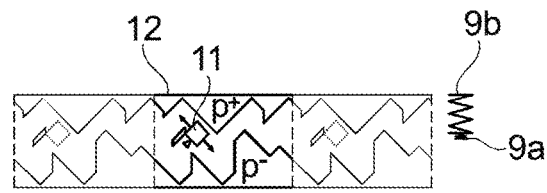

In FIG. 3a, a first intermediate position of the de-energized parking lock operating system 1 is shown. The hydraulic pressure is above the first pressure threshold but below the second pressure threshold, so that the spring force of the operating spring 8 keeps the operating element 2 in its blocked position and the locking element 4 is extended against the spring force of the locking spring 9, in particular the first individual spring 9a (ref. FIG. 2a), until the end 13 rests against the operating element 2 (or an outer contour of the operating element 2). The parking lock is active. The locking element 4 is in its central position because the contact of the locking element 4 with the operating element 2 and/or the spring force of the second individual spring 9b (ref. FIG. 2a) prevents it from engaging in the positive-locking element 14 and the locking element cannot be fully extended into its locking location. A corresponding first intermediate location of the latching mechanism is shown in FIG. 3b. By increasing the pressure above the first pressure threshold (and the associated axial displacement), the latching element 11 was twisted by a first sloping surface 16 (ref. FIG. 2b) of the guide link 12 in a first direction of rotation.

Figure 4A:
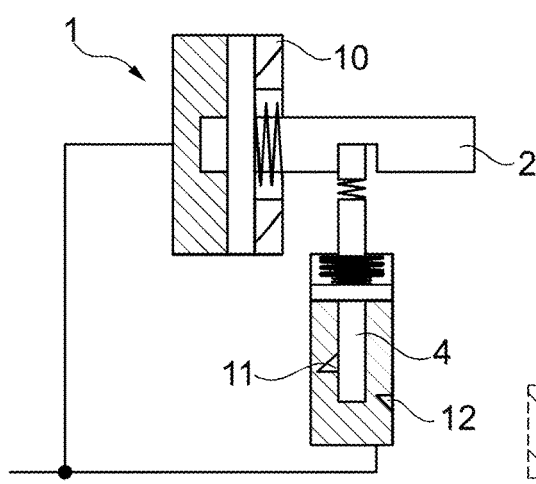
Figure 4B:
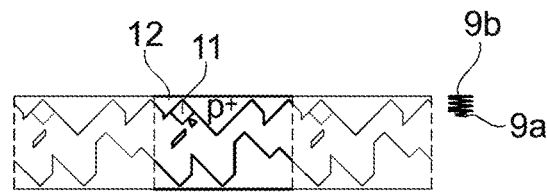

FIG. 4a shows a drive position of the parking lock operating system 1. The hydraulic pressure is above the second pressure threshold, so that the operating element 2 is extended against the spring force of the operating spring 8 and pressed into its unblocked position. The parking lock is inactive. Since the operating element 2 is now in its unblocked position and the pressure is above the second pressure threshold, the locking element 4 can be extended further against the spring force of the locking spring 9, in particular the second individual spring 9b, engage in the positive-locking element 14 (ref. FIG. 2a) and assume its locking position. The holding magnet 10 is energized and holds the operating element 2 in its unblocked position. A corresponding driving location of the latching mechanism is shown in FIG. 4b. Due to the increase in the pressure above the second pressure threshold (and the associated axial displacement), the latching element 11 (starting from the first intermediate location) was twisted/turned back by a second sloping surface 17 (ref. FIG. 2b) of the guide link 12 in a second direction of rotation (opposite to the first direction of rotation).

A position of the energized parking lock operating system 1 is shown in FIG. 5a and FIG. 6a. The hydraulic pressure is below the second pressure threshold, but the holding magnet 10 is energized, so that the operating element 2 is held by the holding magnet 10 in its unblocked position. The parking lock is inactive. The locking element 4 is retracted by the spring force of the second individual spring 9b (see FIG. 5a) and by the spring force of the first individual spring 9a (see FIG. 6a). A corresponding location of the latching mechanism is shown in FIG. 5b and FIG. 6b. By lowering the pressure (and the associated axial displacement) below the second pressure threshold (see FIG. 5b) and below the first pressure threshold (see FIG. 6b), the latching element 11 is placed in its base location by the guide link 12.

In FIG. 7a, the first intermediate position of the de-energized parking lock operating system 1 is shown again. The hydraulic pressure is above the first pressure threshold but below the second pressure threshold, so that the spring force of the operating spring 8 keeps the operating element 2 in its blocked position and the locking element 4 is extended against the spring force of the locking spring 9, in particular the first individual spring 9a, until the end 13 rests against the operating element 2. The parking lock is active. The locking element 4 is in its central position because the contact of the locking element 4 with the operating element 2 and/or the spring force of the second individual spring 9b prevents it from engaging in the positive-locking element 14 and the locking element cannot be fully extended into its locking location. In FIG. 7b the corresponding first intermediate location of the latching mechanism is shown. By increasing the pressure above the first pressure threshold, the latching element 11 (starting from the base location) was twisted by the first sloping surface 16 of the guide link 12 in the first direction of rotation.

Figure 8A:
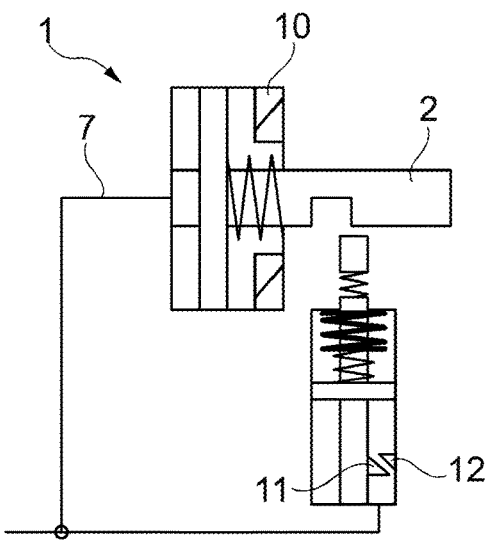
Figure 8B:
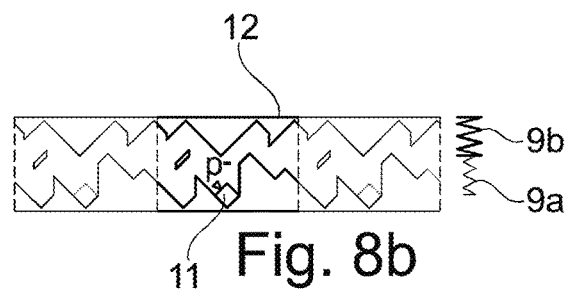

In FIG. 8a, a transport position of the de-energized and depressurized parking lock operating system 1 is shown. The hydraulic pressure is below the first pressure threshold, so that the spring force of the operating spring 8 holds the operating element 2 in its blocked position and the spring force of the locking spring 9 holds the locking element 4 in its unlocked position. The parking lock is active. A corresponding transport location of the latching mechanism is shown in FIG. 8b. The latching element 11 is located in a transport lane 18 (ref. FIG. 2b) of the guide link 12. By lowering the pressure below the first pressure threshold, the latching element 11 (starting from the first intermediate location) was twisted by a third sloping surface 19 (ref. FIG. 2b) of the guide link 12 in the first direction of rotation.

Figure 9A:
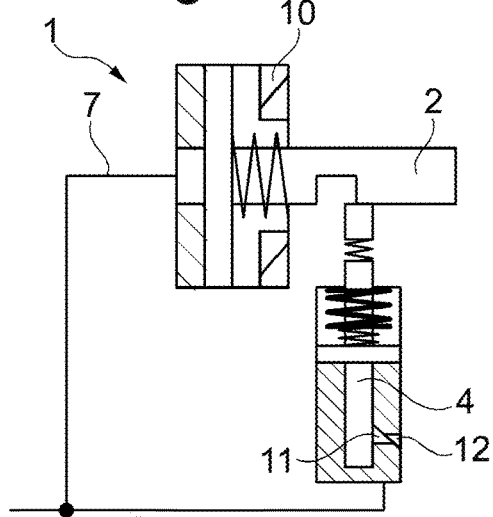
Figure 9B:
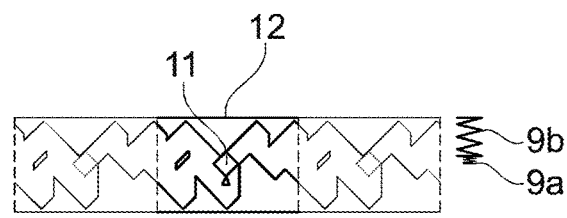
Figure 10A:
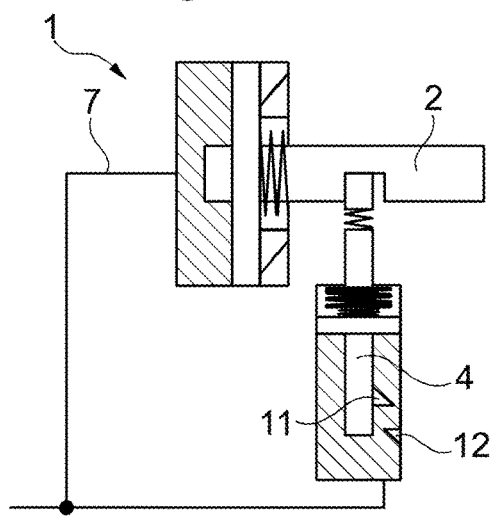
Figure 10B:
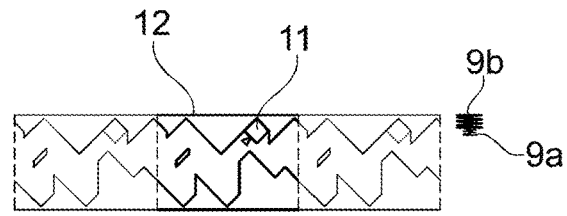

A second intermediate position of the parking lock operating system 1 is shown in FIG. 9a and FIG. 10a. The hydraulic pressure is first increased above the first pressure threshold (cf. FIG. 9a), so that the spring force of the operating spring 8 initially keeps the operating element 2 in its blocked position and the locking element 4 is extended against the spring force of the locking spring 9, in particular the first individual spring 9a, until the end 13 is in contact with the operating element 2, but cannot be fully extended into its locking location, since the contact of the locking element 4 with the operating element 2 and/or the spring force of the second individual spring 9b prevents it from engaging in the positive-locking element 14. The hydraulic pressure is then increased above the second pressure threshold (cf. FIG. 10a), so that the operating element 2 is extended against the spring force of the operating spring 8 and pressed into its unblocked position, and the locking element 4 is further extended against the spring force of the locking spring 9, in particular the second individual spring 9b, engages in the positive-locking element 14 and assumes its locking position, since the operating element 2 is now in its unblocked position. A corresponding second intermediate location of the latching mechanism is shown in FIG. 9b and FIG. 10b. By increasing the pressure above the second pressure threshold, the latching element 11 (starting from the transport location) was twisted by a fourth sloping surface 20 (ref. FIG. 2b) of the guide link 12 in the first direction of rotation.

Figure 11A:
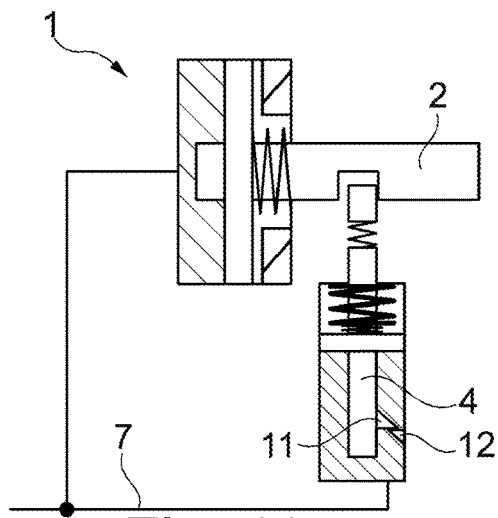
Figure 11B:
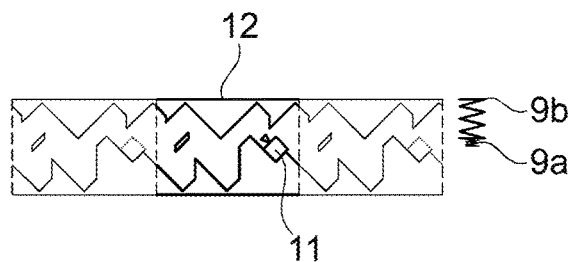

In FIG. 11a, a latching position of the de-energized and depressurized parking lock operating system 1 is shown. The hydraulic pressure is below the first pressure threshold, but the operating element 2 is held in its unblocked position by the locking element 4 and the locking element 4 is held in its locked position by the latched latching element 11, since due to the activated latching mechanism, the locking element 4 cannot move back out of its locking position against the spring force of the locking spring 9, in particular the first individual spring 9a. The parking lock remains inactive. A corresponding latching location of the latching mechanism is shown in FIG. 11b. By lowering the pressure below the second pressure threshold, the latching element 11 (starting from the second intermediate location) was twisted by a fifth sloping surface 21 (ref FIG. 2b) of the guide link 12 in the first direction of rotation. Due to the geometry of the guide link 12, the latching element 11 remains mechanically arrested in the latching location holding the locking element 4 in its locking position, even in the depressurized state.

Figure 12A:
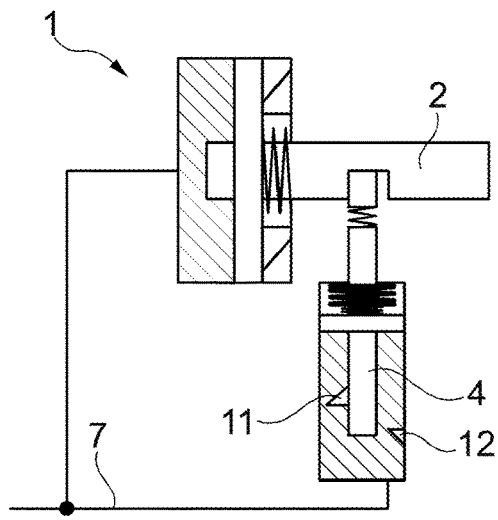
Figure 12B:
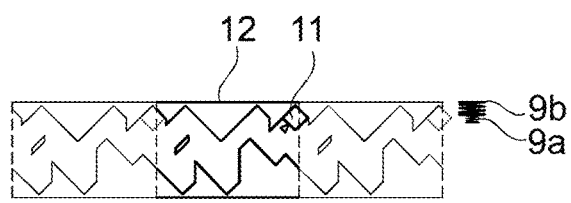

A third intermediate position of the de-energized parking lock operating system 1 is shown in FIG. 12a. The hydraulic pressure is above the second pressure threshold, so that the operating element 2 is extended against the spring force of the operating spring 8 and pressed into its unblocked position. The parking lock is inactive. Since the operating element 2 is now in its unblocked position and the pressure is above the second pressure threshold, the locking element 4 can be extended further against the spring force of the locking spring 9, in particular the second individual spring 9b, engage in the positive-locking element 14 and assume its locking position. In FIG. 4b a corresponding third intermediate location of the latching mechanism is shown. By increasing the pressure above the second pressure threshold, the latching element 11 (starting from the latching location) was twisted by a sixth sloping surface 22 (ref. FIG. 2b) of the guide link 12 in the first direction of rotation.

Figure 13A:
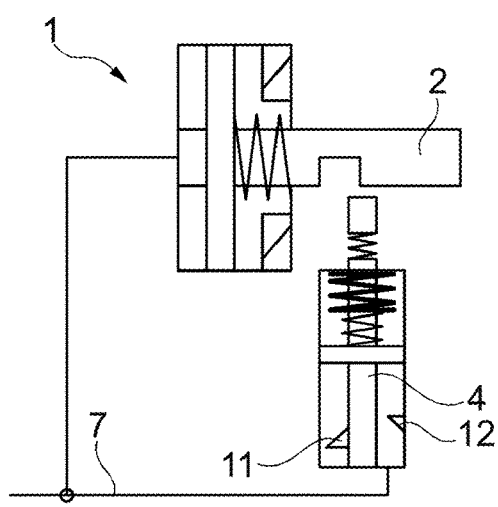
Figure 13B:
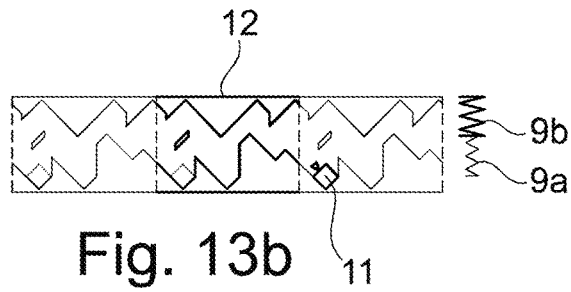

In FIG. 13a, the base position of the de-energized and depressurized parking lock operating system 1 is shown. The hydraulic pressure is below the first pressure threshold, so that the spring force of the operating spring 8 holds the operating element 2 in its blocked position and the spring force of the locking spring 9 holds the locking element 4 in its unlocked position. The parking lock is active. In FIG. 13b the corresponding base location of the latching mechanism is shown. By lowering the pressure below the first pressure threshold, the latching element 11 (starting from the third intermediate location) was twisted by a seventh sloping surface 23 (ref. FIG. 2b) of the guide link 12 in the first direction of rotation. The latching element 11 is again in the normal lane 15 of the guide link 12.

Thus, the latching mechanism or the parking lock operating system 1 is designed in such a way that it is switched into the base position from any location/setting by applying pressure twice above the second pressure threshold.

REFERENCE NUMERALS

1 Parking lock operating system
2 Operating element
4 Locking element
5 Operating cylinder
6 Locking cylinder
7 Hydraulic fluid supply line
8 Operating spring
9 Locking spring
10 Holding magnet
11 Latching element
12 Guide link
13 End
14 Positive-locking element
15 Normal lane
16 First sloping surface
17 Second sloping surface
18 Transport lane
19 Third sloping surface
20 Fourth sloping surface
21 Fifth sloping surface
22 Sixth sloping surface
23 Seventh sloping surface

The invention claimed is:

1. A method for resetting a parking lock operating system for a motor vehicle, the parking lock operating system comprising a base position in which a parking lock of the parking lock operating system is active and a transport position in which the parking lock is active, wherein the parking lock operating system is switched both from the base position and from the transport position to the base position when a pressure present in a hydraulic fluid supply line of the parking lock operating system is successively increased twice above a second pressure threshold and is lowered after each pressure increase above the second pressure threshold below a first pressure threshold, which is at a lower pressure value than the second pressure threshold.

2. The method according to claim 1, wherein the parking lock operating system which is in the base position is switched into a driving position, in which the parking lock is inactive and an activation of the parking lock is blocked when a holding magnet of the parking lock operating system is energized, when the pressure present in the hydraulic fluid supply line is increased above the second pressure threshold.

3. The method according to claim 2, wherein the parking lock operating system in the driving position is switched to the base position when the pressure present in the hydraulic fluid supply line is lowered below the first pressure threshold.

4. The method according to claim 1, wherein the parking lock operating system which is in the transport position is switched into a latching position, in which the parking lock is inactive and an activation of the parking lock is blocked by a latching mechanism of the parking lock operating system, when the pressure present in the hydraulic fluid supply line is increased above the second pressure threshold and then is lowered below the first pressure threshold.

5. The method according to claim 4, wherein the parking lock operating system in the latching position is switched to the base position when the pressure present in the hydraulic fluid supply line is increased above the second pressure threshold and then lowered below the first pressure threshold.

6. A parking lock operating system for a motor vehicle, comprising a guide link and a latching element that can be twisted and axially displaced relative to the guide link, wherein a location of the latching element relative to the guide link defines different positions of the parking lock operating system, wherein the latching element and the guide link have corresponding sloping surfaces which are coordinated and interact with each other in such a way that the latching element is twisted in response to an axial displacement of the latching element along the corresponding sloping surfaces relative to the guide link, the axial displacement being caused by a pressure present in a hydraulic fluid supply line of the parking lock operating system, wherein the corresponding sloping surfaces are arranged such that the parking lock operating system both from a base position, in which a parking lock of the parking lock operating system is active, as well as from a transport position, in which the parking lock is active, is switched to the base position when the pressure present in the hydraulic fluid supply line is increased twice in succession over a second pressure threshold and is lowered after each pressure increase above the second pressure threshold below a first pressure threshold, which is at a lower pressure value than the second pressure threshold.

7. The parking lock operating system according to claim 6, wherein a first sloping surface of the guide link is arranged in such a way that from a base location, which defines the base position of the parking lock operating system, the latching element is twisted into a first intermediate location in a first direction of rotation when the pressure is increased above the first pressure threshold, or a second sloping surface of the guide link is arranged in such a way that the latching element is twisted from the first intermediate location in a second direction of rotation counter to the first direction of rotation into a driving location, which defines a driving position of the parking lock operating system, when the pressure is increased above the second pressure threshold, or a third sloping surface of the guide link is arranged in such a way that the latching element is twisted from the driving location in the first direction of rotation into a transport location, which defines the transport position of the park lock operating system, when the pressure is lowered below the first pressure threshold.

8. The parking lock operating system according to claim 7, wherein a fourth sloping surface of the guide link is arranged in such a way that the latching element is twisted from the transport location in the first direction of rotation into a second intermediate location when the pressure is increased above the second pressure threshold, or a fifth sloping surface of the guide link is arranged in such a way that the latching element is twisted from the second intermediate location in the first direction of rotation into a latching location, which defines a latching position of the parking lock operating system, when the pressure is lowered below the first pressure threshold.

9. The parking lock operating system according to claim 8, wherein a sixth sloping surface of the guide link is arranged in such a way that the latching element is twisted from the latching location in the first direction of rotation into a third intermediate location when the pressure is increased above the second pressure threshold, and/or a seventh sloping surface of the guide link is arranged in such a way that the latching element is twisted from the third intermediate location in the first direction of rotation into the base location when the pressure is lowered below the first pressure threshold.

10. A method for resetting a parking lock operating system for a motor vehicle, comprising:
providing the parking lock operating system, the parking lock operating system comprising:
a hydraulic fluid supply line comprising a hydraulic fluid;
a base position in which a parking lock is active; and
a transport position in which the parking lock is active; and
switching the parking lock operating system from the base position and back to the base position or switching the parking lock operating system from the transport position to the base position by, in the following order:
increasing a pressure of the hydraulic fluid above a second pressure threshold;
lowering the pressure below a first pressure threshold, less than the second pressure threshold;
increasing the pressure above the second pressure threshold; and
lowering the pressure of the hydraulic fluid below the first pressure threshold.

11. The method of claim 10 wherein:
the parking lock operating system further comprises:
a latching mechanism; and
a latching position in which the parking lock is inactive and activation of the parking lock is blocked by the latching mechanism; and
the method further comprises switching the parking lock operating system from the transport position to the latching position by, in the following order:
increasing the pressure above the second pressure threshold; and
lowering the pressure below the first pressure threshold.

12. The method of claim 11, wherein the method further comprises switching the parking lock operating system from the latching position to the base position by:
increasing the pressure above the second pressure threshold; and
lowering the pressure below the first pressure threshold.

13. The method of claim 10, wherein:
the parking lock operating system further comprises:
a holding magnet; and
a driving position in which the parking lock is inactive and activation of the parking lock is blocked when the holding magnet is energized; and
the method further comprises switching the parking lock operating system from the base position into the driving position by increasing the pressure above the second pressure threshold.

14. The method of claim 13 wherein:
the parking lock operating system further comprises:
a latching mechanism; and
a latching position in which the parking lock is inactive and activation of the parking lock is blocked by the latching mechanism; and
the method further comprises switching the parking lock operating system from the transport position to the latching position by, in the following order:
increasing the pressure above the second pressure threshold; and
lowering the pressure below the first pressure threshold.

15. The method of claim 14, wherein the method further comprises switching the parking lock operating system from the latching position to the base position by:
increasing the pressure above the second pressure threshold; and
lowering the pressure below the first pressure threshold.

16. The method of claim 13, further comprising switching the parking lock operating system from the driving position to the base position by lowering the pressure below the first pressure threshold.

17. The method of claim 16 wherein:
the parking lock operating system further comprises:
a latching mechanism; and
a latching position in which the parking lock is inactive and activation of the parking lock is blocked by the latching mechanism; and
the method further comprises switching the parking lock operating system from the transport position to the latching position by, in the following order:
increasing the pressure above the second pressure threshold; and
lowering the pressure below the first pressure threshold.

18. The method of claim 17, wherein the method further comprises switching the parking lock operating system from the latching position to the base position by:
increasing the pressure above the second pressure threshold; and
lowering the pressure below the first pressure threshold.

* * * * *